United States Patent Office

Re. 27,870
Reissued Jan. 8, 1974

27,870

FOLDABLE BLANKS AND CARTONS, BOXES, TRAYS OR PACKING CASES MADE THEREFROM

Karl Rune Persson, Halmstad, Sweden, assignor to AB Ahlen & Akerlund, Forpackning, Halmstad, Sweden Original No. 3,112,854, dated Dec. 3, 1963, Ser. No. 140,004, Sept. 22, 1961. Application for reissue Mar. 26, 1973, Ser. No. 345,236

Int. Cl. B65d *5/18*

U.S. Cl. 229—39 R 14 Claims

Matter enclosed in heavy brackets [ ] appears in the original patent but forms no part of this reissue specification; matter printed in italics indicates the additions made by reissue.

ABSTRACT OF THE DISCLOSURE

A carton formed of a blank having fold lines to form at least bottom and side panels when folded along the fold lines. Pairs of cooperating engaging panels are interlocked with one another by the provision of an insertion slot in one panel and a cooperating tab forming the slot in the other panel. One of the pair of panels is inserted into the slot of the other panel until the edge of one panel engages a fold line along which the other panel is folded, to assure registry of the cooperating slots with the tab portion of the tab being offset from the other slot. Interlocking is obtained by applying sidewise pressure to the tab thereby snapping the tab over a portion of the other slot.

The present invention relates to foldable blanks made of paper board or a similar substance, and to cartons, boxes, trays or packing cases (hereinafter called "cartons") formed or set-up therefrom. These carton blanks are of the kind in which panels, which, in the set-up carton, form hingedly or foldably interconnected side walls, have at opposite ends thereof interengaging flaps, one of which has a tab insertable into an insertion slot in the other flap to provide locked ends for the carton. It is to be understood that, except in trays, one of the side walls normally forms a hinged lid for the carton.

The main object of the invention is to provide blanks of the kind set forth which are so formed that as the blanks are folded or set-up to form cartons the interengaging paired end wall flaps are effectively locked in the set-up position.

Another object of the invention is to provide such blanks of such forms that in spite of the secure locking obtainable on set-up the lock is easy to release, as and when required.

With these objects in view the present invention provides a carton blank comprising wall-forming panels having pairs of extending flaps, one flap of each pair having an insertion slot into which a tab on the flap paired therewith can be inserted and locked, characterized in that the insertion flap is also provided with a locking slot which when the tab has been inserted into the insertion slot lies adjacent said insertion slot, one of the two slots being formed along its length with a lateral tongue-like projection for engaging within said other slot in order to lock the insertion tab in its inserted position.

The lateral tongue-like projection, which would usually be provided in the insertion slot, but may alternatively be formed in the locking slot, may be divided by a slit to form bendable lugs to facilitate the locking action. The locking slot may be similarly slit along at least one edge thereof.

In order that the invention may be more readily understood, some embodiments thereof will now be described, by way of example, with reference to the accompanying drawings wherein.

Figure 1:
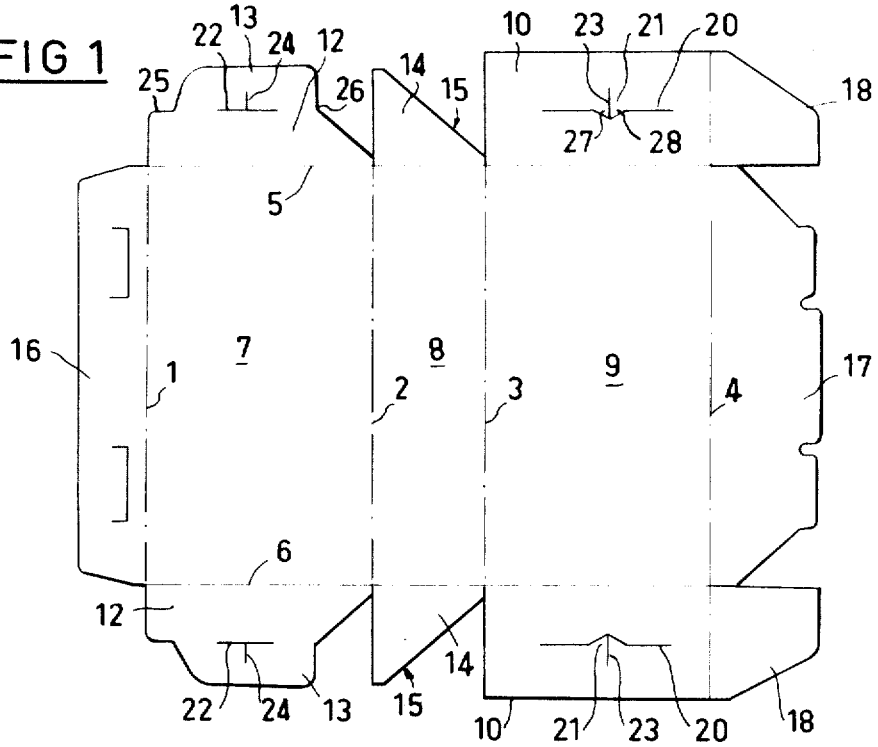
FIGURE 1 shows, in its flat condition, one form of blank according to the invention.

The blank shown in FIGURE 1 is marked off by means of score or fold lines 1, 2, 3, 4, 5 and 6 into three rectangular panels which in the set-up carton form major side walls 7 and 9 and a connecting wall 8. At its opposite short ends the major side wall 9 has extensions which form short end walls 10, and similarly the major side wall 7 (which in the set-up carton opposes wall 9) has extension flaps 12 formed with insertion tabs 13.

The side wall 8, which in this case forms the base or floor of the carton, is also prolonged by two supporting flaps 14 of triangular shape. For the formation of the remaining wall, that is, the lid of the carton, inner and outer flaps 16 and 17 are provided along the outer long edges of the side walls 7, 9 respectively and corner flaps 18 are provided on corresponding short edges of the end walls 10.

Each of the short ends 10 has an insertion slot 20 for the reception of the appropriate insertion tab 13 on the short edges of side wall 7.

In order to lock the insertion tabs 13 of flaps 12 of side wall 7, when they are inserted into the insertion slots 20, of the end walls 10, each insertion slot 20 along a part of its length, is locally offset in relation to the main direction of the slot to form a lateral triangular tongue-like projection 21, which is adapted to enter and co-act with a locking slot 22 provided in each of the insertion tabs 13. In order to co-act with locking slots 22, to lock tabs 13 to end walls 10 the projections 21 are adapted to be bent outwards and to facilitate this bending each projection 21 is divided by means of a dividing slit 23 which extends inward from the apex of the triangular projection, substantially perpendicular to the direction of slot 20. The locking slots 22 and insertion slots 20 are disposed parallel to the score lines 5, 6 which are common to ends 10 and flaps 12. Similarly a slit 24 extends inwards from an substantially perpendicular to each locking slot 22, the purpose of which is also to facilitate the bending-out of the tongue-like projection 21 in the manner to be more particularly described with reference to FIGURES 3 to 5.

Figure 2:
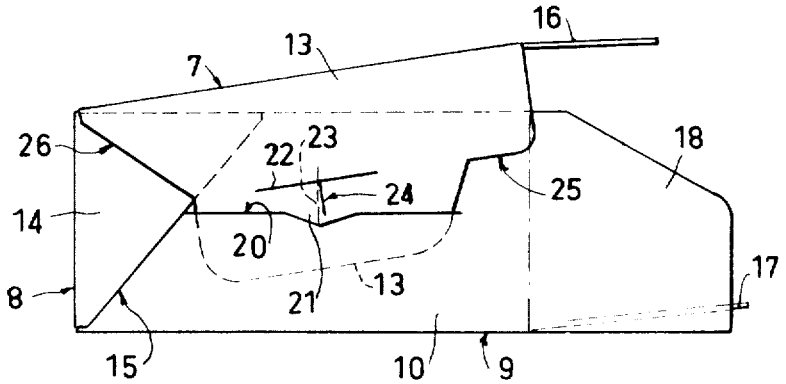
FIGURE 2 is an end view of a partly folded carton formed from the blank shown in FIGURE 1, the insertion flap being shown in a position reached directly before it is completely pushed into the insertion slot.

As can be seen from FIGURE 2, the short end walls 10 (with their corner flaps 18, respectively) are first folded up along score lines 5, 6 and then the supporting flaps 14 are bent over on to the outsides of said short end walls 10, and the insertion tabs 13 of the extension flaps 12 of side walls 7 introduced into the insertion slots 20 in said short end walls 10.

Figure 3:
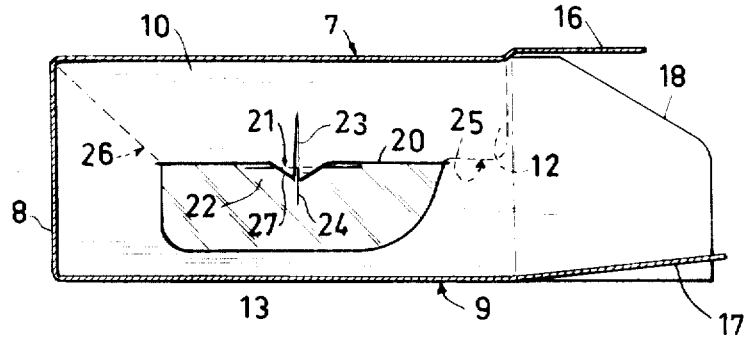
FIGURE 3 is a cross-section through an almost completely set-up carton formed from the blank shown in FIGURE 1, and showing the inside of one short end of the carton, with the insertion flap completely pushed through the insertion slot, but with the offset tongue-like projection still in an ineffective position.

When the insertion tab 13 has been completely pushed into its corresponding insertion slot 20 in the short end wall 10 (as shown in FIGURE 3) a shoulder 25 on one end of the flap 12 bears against one end of the end wall slot 20, and a shallow-V edge notch 26 on the other end of said flap 12 bears against the other end of said slot 20, thereby trapping the supporting flap 14 in position.

The side wall 7 rests on the upper edges of the short end walls 10, close to the upper edges of flaps 14. Each projection 21 is provided by reason of slit 23 with lugs 27, 28 which lie on the inside of the corresponding inserted tab 13.

Figure 4:
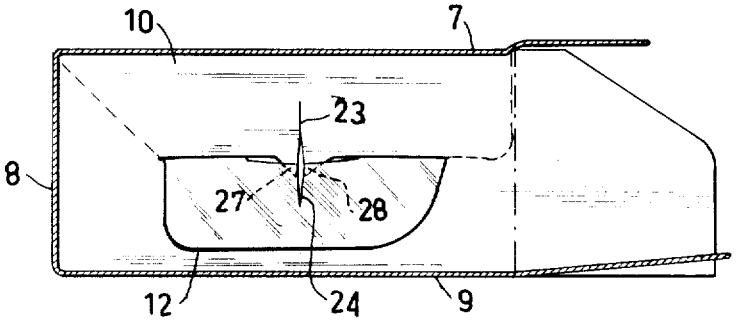
FIGURE 4 shows the carton in substantially the same condition as that shown in FIGURE 3, except that the offset projection has been bent through the insertion slot in the insertion flap.
Figure 5:
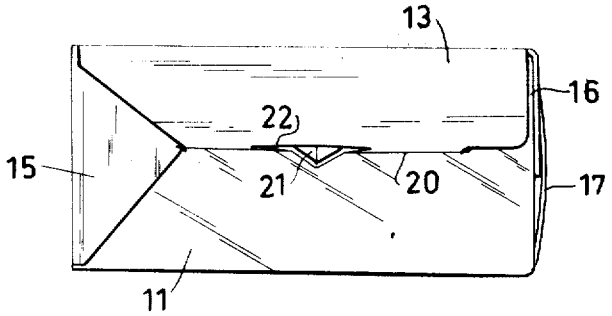
FIGURE 5 is an end view of the carton, now completely closed and showing the insertion flap locked by the bent-out projection.

In order to lock the flaps 12 in position a suitable pressing element (not shown) is applied against the locking lugs 27, 28 of the projections 21 which now lie inside the partly set-up carton, said lugs being bent out through the locking slots 22 of flaps 12, whereas the supporting flaps 14, by their sloping edges 15, where they cross between the locking slots 22 and the dividing slits 24 in the flaps 12, force back the locking lugs 27, 28 of the projections 21 into the locking positions shown in FIGURE 4. The locking lugs 27, 28 in the projections 21 thus effectively *locking* [lock] the tabs 13 of flaps 12 in their inserted positions.

In order to open the carton it is simply necessary to press in the projections 21 (see FIGURE 5) so that the tabs 13 of flaps 12 can be easily pulled out of the end wall slots 20. The carton may then be completely opened cut and laid back flat for exposing the goods contained therein, an important advantage when deep frozen goods are contained in the carton.

Figure 2A:
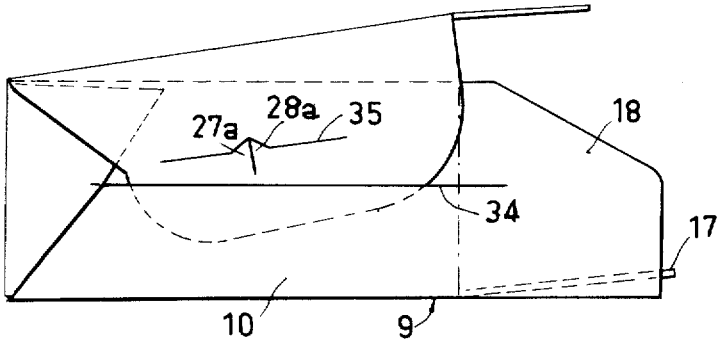
FIGURE 2a is an end view as FIGURE 2, of a modification of the blank shown in FIGURE 1.
Figure 5A:
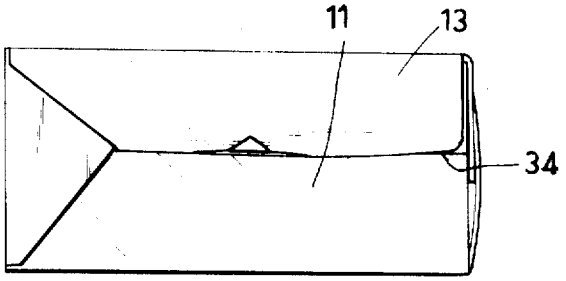
FIGURE 5a, is a similar view as FIGURE 5, of the carton shown in FIGURE 2a, in closed position.

In the modified carton shown in FIGURE 2a, the short end walls 10 are each provided with a straight slot 34, which extends somewhat into flap 18. The tabs 13 of flaps 12 are each provided with a slot 35 formed at the middle with locking lugs 27a, 28a directed upwardly and adapted to be snapped behind the upper edge of slot 34 as shown in FIGURE 5a.

Figure 6:
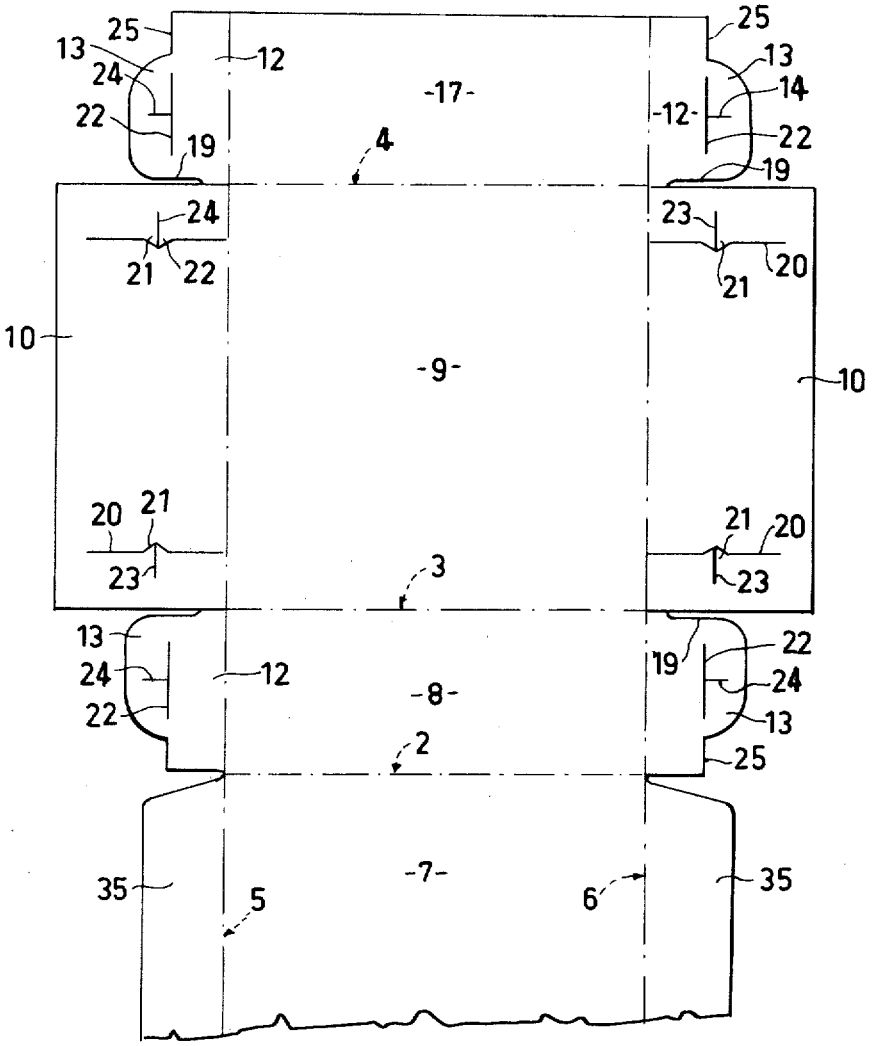
FIGURES 6 and 7 show, in the flat condition, two further forms of carton blanks hereinafter more particularly described.
Figure 7:
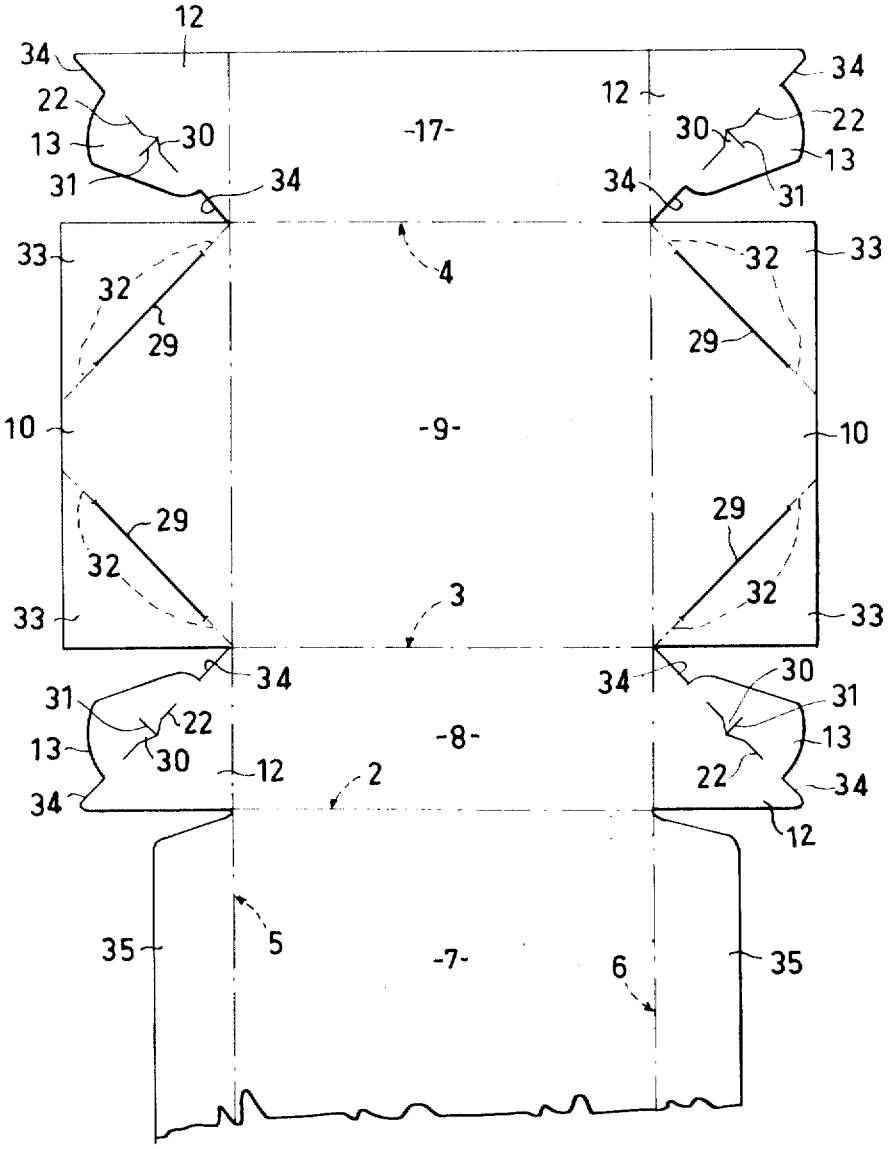

In the two modified forms of blank shown in FIGURES 6 and 7, the same reference numbers as employed in FIGURES 1 to 5 are used to indicate similar parts. Both of these modified blanks differ from that shown in FIGURE 1 in that the insertion slots 20 in the end walls 10 of major walls 9 are duplicated and each of the narrower wall 8 and flap 17 flanking and joined to wall 9 have substantially similar extension flaps 12 with tabs 13, the supporting flaps 14 and corner flaps 18 being dispensed with. That is, flaps 12 and tabs 13 of major wall 7 in FIGURE 1 are transferred in FIGURES 6 and 7 to wall 8 (replacing flaps 14) and the tabbed flaps 12 are duplicated on flap 17, in lieu of corner flaps 18.

In the blank shown in FIGURE 6 the insertion slots 20 are disposed parallel one to the other, perpendicular to score lines 5, 6 but the slit-edge locking slots 22 remain parallel to the score lines as in FIGURE 1. Since in the FIGURE 6 blank the triangular supporting flaps 14 are dispensed with there is no need for the V notches 26 on flaps 12 and consequently the inner edges 19 of flaps 12 may be parallel to and spaced from the adjacent edges of end walls 10.

The blank shown in FIGURE 7 differs from that shown in FIGURE 6 in that plain insertion slots 29 are provided on end walls 10, said slots being at right angles one to the other and equiangularly disposed, that is, at 45°, in relation to score lines 5, 6. Consequently the insertion tabs 13 project from the hypotenuse sides of triangular flaps 12 and the locking slots 22 are formed with lateral tongue-like projections 30, divided by slits 31, similar to the slit projections 21 employed in the blanks shown in FIGURES 1 and 6.

The plain insertion slots 29 are made along crease lines 32 along which the outer triangular corners 33 of end walls 10 are foldable. The insertion tabs 13 of triangular flaps 12 are insertable into slots 29 until shoulder 34 on flaps 12 rest against the fold of the doubled in corners 33; the locking slots 22 align with shoulder 34 so that the projections 30 engage slots 29.

In each of the blanks shown in FIGURES 6 and 7 the major wall 7 (which forms a hinged lid for the tray constituted by the remainder of the blank) no longer has lockable flaps and accordingly may have plain marginal flanges 35 which are turned down over the ends of the carton. The outer or front edge (not shown) of wall 7 may have a flange which is turned down over the wall or flap 17.

Figure 8:
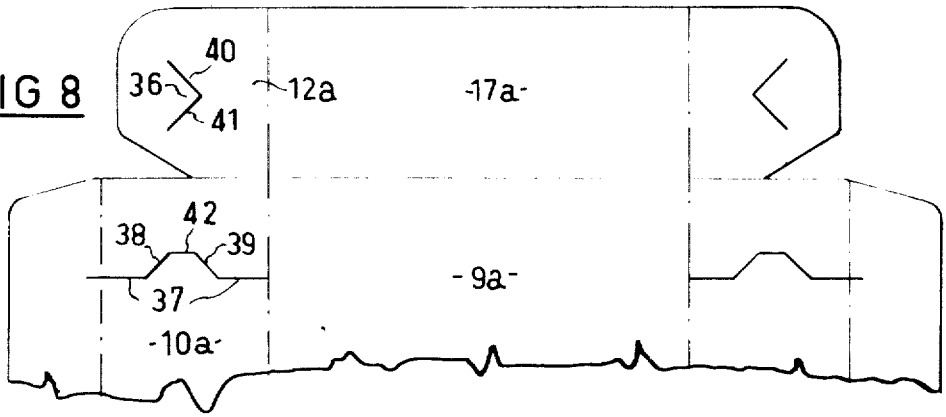
FIGURE 8 shows an end portion of another embodiment of the blank according to the invention.
Figure 9:
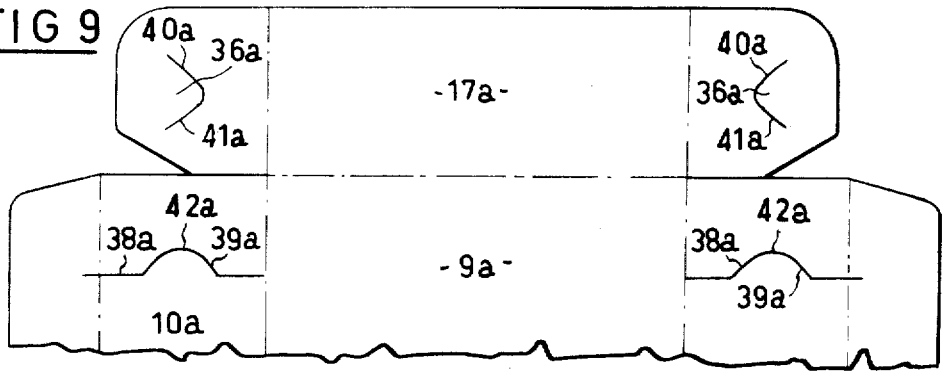
FIGURE 9 shows a modification of the blank FIGURE 8.

The two modified forms of blanks shown in FIGURES 8 and 9 are especially suitable when the height of the carton is relatively low, that is when the slots 20 in FIGURE 6 becomes shorter which may result in difficulties to bend the projections 21. In order to facilitate the locking action the blank in FIGURE 8 is provided at each corner with a relatively large locking lug 36 in flap 12a which cooperates with a locking slot 37 in flap 10a. This slot has two legs 38, 39 which in the inserted position shown in FIGURE 10 coincide with the edges 40, 41 of the lug 36. The legs 38, 39 are however somewhat shorter than the legs 40, 41 and are connected by a locking edge 42. The pointed end of lug 36 is snapped behind this edge 42 and at the same time the edges 40, 41 cooperate with the edges 38, 39 of the slot 32 to lock the flaps 12a in its inserted position as shown in FIGURE 10.

Figure 10:
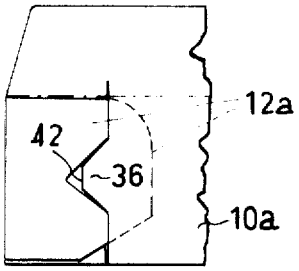
FIGURE 10 shows a locked corner of a carton made from the blank in FIGURE 8.
Figure 11:
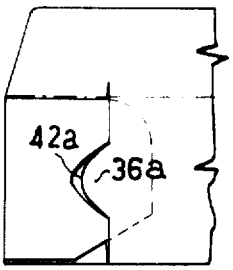
FIGURE 11 is a similar view of a locked corner of a carton made from the blank in FIGURE 9.

The blank in FIGURE 9 and the corresponding corner lock in FIGURE 11 differs from those shown in FIGURES 8 and 10 only in that the edges 40a, 41a form a lug with round contour and in that the legs 38a, 39a and the edge 42a form a corresponding area which with its tip end, in the inserted position in FIGURE 11, extends somewhat past the edge 42a and is bent over the same into locking position.

What is claimed is:

1. In a carton of foldable material having a number of interconnected panels forming the walls of the carton, at least one pair of said panels being interconnected by means of a tab forming an extension of one of said two panels and inserted into a substantially straight lined insertion slot of the other panel to an inserted end position within said slot, said tab having a slot substantially coincident with said insertion slot except at its middle portion where it is formed with a substantially triangular lug divided into two halves by means of a slit extending from its apex, said lug overlapping the adjacent straight portion of said insertion slot and being snapped into the same to engage one of its edges to positively prevent retraction of said tab from its inserted end position.

2. In a carton of foldable material having a number of interconnected panels forming the walls of the carton, at least one pair of said panels being interconnected by means of a tab forming an extension of one of said two panels and inserted into a substantially straight lined insertion slot of the other panel to an inserted end position in said slot, said tab having a straight lined locking slot substantially coincident with said insertion slot which at its middle portion is formed with a lug overlapping the adjacent straight portion of said locking slot and being snapped into the same to engage one of its edges to prevent retraction of said tab from its inserted end position, said locking slot of said tab being interrupted, at least along one edge thereof, in the region where said lug has been bent into said locking slot to engage one of its edges, by means of a dividing slit extending substantially perpendicular to said locking slot.

3. A carton of foldable material having side walls hingedly connected to a bottom wall, at least one pair of adjacent side walls being interconnected by means of a tab forming an extension at the end of one side wall and inserted into an insertion slot in the other side wall to an inserted end position, said insertion slot having two end portions in line with each other and an intermediate portion comprising two straight lined side legs converging in opposite direction to the insertion direction of said tab and connected at their outer ends by a straight lined transverse portion, said tab having a V-shaped slot comprising two legs substantially coinciding with the legs of said intermediate portion of said insertion slot and forming a top end overlapping said transverse portion of said insertion slot, said top end being snapped over the outer edge of said transverse insertion slot portion to engage the same and [present] *prevent* the tab from being retracted from its inserted end position.

4. A carton of foldable material having side walls hingedly connected to a bottom wall, at least one pair of adjacent side walls being interconnected by means of a tab forming an extension at the end of one side wall and inserted into an insertion slot in the other side wall, to an inserted end position, said insertion slot having two end portions in line with each other and an intermediate curved portion comprising two side portions extending in opposite direction to the insertion direction of said tab and connected at their ends by a transverse middle portion, said tab having a curved slot comprising two side portions substantially coinciding with adjacent side portions of said curved intermediate portion of said insertion slot, but extending somewhat further than its side portions to form a top end overlapping said transverse middle portion of said insertion slot, said top end being snapped over the outer edge of said transverse middle portion to engage the same and prevent the tab from being retracted from its inserted end position.

5. [In a] *A* carton of foldable material having a plurality of *fold lines, said carton being folded therealong to define* interconnected panels forming the walls of the carton, at least one pair of said panels being interconnected by means of a tab forming an extension of one of said two panels, *said extension being bent at an angle relative to its associated panel by a fold line to enable said tab to engage* and *be* inserted into an insertion slot in the other panel to *move to* an inserted end position, *the edge of the panel having the insertion slot engaging the fold between the tab and its associated panel to maintain said slots in registry when said lug is moved to the locking position*, a slot in said tab extending adjacent said insertion slot and having its end portions [registering] *in registry* with said insertion slot and spaced from the side edges of said tab, said two slots registering with each other along the whole length of said tab slot except for a portion of one of said two slots, said portion deviating from the other slot to form a locking lug which is to be snapped [sidewise] from an overlying position through said other slot into an underlying positive locking position.

6. In a carton of foldable material having a plurality of interconnected panels forming the walls of the carton, at least one pair of said panels being interconnected by means of a tab forming an extension of one of said two panels and inserted into an insertion slot of the other panel to an end position, a slot in said tab extending adjacent said insertion slot and having its end portions registering with said insertion slot and spaced from the side edges of said tab, said two slots registering with each other along the whole length of said tab slot except for a portion of one of said two slots, said portion deviating from the other slot to form a locking lug which is to be snapped from an overlying position through said other slot into an underlying positive locking position, said lug being formed by a deviating portion of said tab slot and extending in opposite direction relative to the insertion direction of said tab [.], *said tab slot and said insertion slot being in registry when the free edge of one of said pair of panels engages the fold line of the other of said pair of panels.*

7. In a carton of foldable material having a plurality of interconnected panels forming the walls of the carton, at least one pair of said panels being interconnected by means of a tab forming an extension of one of said two panels and inserted into a substantially straight lined insertion slot of the other panel to an inserted end position within said slot, a slot in said tab extending adjacent said insertion slot and having its end portions registering with said insertion slot and spaced from the side edges of said tab, said two slots registering with each other along the whole length of said tab slot except for a portion of one of said two slots, said portion deviating from the other slot to form a locking lug which is to be snapped from an overlying position through said other slot into an underlying positive locking position, said lugs being formed by a V-shaped deviating portion of said tab slot and extending in opposite direction relative to the insertion direction of said tab [.], *said tab slot and said insertion slot being in registry when the free edge of one of said pair of panels engages the fold line of the other of said pair of panels.*

8. In a carton of foldable material having a plurality of interconnected panels forming the walls of the carton, at least one pair of said panels being interconnected by means of a tab forming an extension of one of said two panels and inserted into an insertion slot of the other panel to an end position, said tab being formed, at least on its one side edge, with an abutment portion or shoulder cooperating with one edge of said insertion slot to prevent insection past said end position of said tab, a slot in said tab extending adjacent said insertion slot and having its end portions registering with said insertion slot and spaced from the side edges of said tab, said two slots registering with each other along the whole length of said tab slot except for a portion of one of said two slots, said portion deviating from the other slot to form a locking lug which is to be snapped from an overlying position through said other slot into an underlying positive locking position.

9. A carton of foldable material having side walls hingedly connected to a bottom wall, at least one pair of adjacent side walls being interconnected by means of a tab forming an extension at the end of one side wall and inserted into an insertion slot in the other side wall to an inserted end position, a slot in said tab extending adjacent said insertion slot and having its end portions registering with said insertion slot and spaced from the side edges of said tab, said two slots registering with each other along the whole length of said tab slot except for a portion of one of said two slots, said portion deviating from the other slot to form a locking lug which is to be snapped from an overlying position through said other slot into an underlying positive locking position, said insertion slot comprising two side legs converging in a direction opposite to the insertion direction of said tab and connected at their converging end portions by a transverse portion, said tab slot comprising two legs substantially registering with the legs of said insertion slot but deviating from said transverse portion to form said lug which extends beyond said transverse portion of said insertion slot, whereby the slot edges extending into the side edges of said lug will cross the opposite edge portions of the legs of the said insertion slot, and engage them edge to edge to form a wedge like positive lock.

*10. The carton of claim 5 wherein said interconnected panels form adjacent walls of the carton.*

*11. A carton of foldable material having a plurality of fold lines, said carton being folded therealong to define interconnected panels forming the walls of the carton, at least one pair of said panels being interconnected by means of a pair of tabs each forming an extension of said two panels, said extensions being bent at an angle relative to their associated panels by a fold line to enable one of said tabs to engage and be inserted into an insertion slot in the other tab to move to an inserted end position, the edge of the tab having the insertion slot engaging the fold between the tab and its associated panel to maintain said slots in registry when said lug is moved to the locking position, a slot in said one tab extending adjacent said insertion slot and having its end portions in registry with said insertion slot and spaced from the side edges of said one tab, said two slots registering with each other along the whole length of said one tab slot except for a portion the whole length of said one tab slot except for a portion of one of said two slots, said portion deviating from the other slot to form a locking lug which is to be snapped from an overlying position through said other slot into an underlying positive locking position.*

*12. The carton of claim 11 wherein the edge of one of said tabs engages the fold between the other tab and its associated panel to maintain said dots in registry when said lug is moved to the locking position.*

*13. The carton of claim 11 wherein said interconnected panels form parallel walls of the carton.*

*14. The carton of claim 11 wherein said interconnected panels form adjacent walls of the carton.*

References Cited

The following references, cited by the Examiner, are of record in the patented file of this patent or the original patent.

UNITED STATES PATENTS

| | | | |
|---|---|---|---|
| 271,881 | 2/1883 | Marks | 229—35 |
| 528,639 | 11/1894 | Lindemeyer, Jr. | 229—39 R |
| 587,836 | 8/1897 | Lanz | 229—45 |
| 604,419 | 5/1898 | Rousseau | 229—84 |
| 1,963,378 | 6/1934 | Petter | 229—35 X |
| 2,031,834 | 2/1936 | Klefener | 229—38 X |
| 2,569,335 | 9/1951 | Phillips | 229—39 R |
| 2,580,181 | 10/1961 | Meller | 229—35 |
| 3,366,307 | 1/1968 | Persson | 229—39 R |
| 3,556,384 | 1/1971 | Pierce, Jr. | 229—35 |

DAVIS T. MOORHEAD, Primary Examiner

U.S. Cl. X.R.

229—36